July 12, 1938. C. C. GROTH 2,123,302
INTERNAL COMBUSTION ENGINE
Filed March 23, 1937
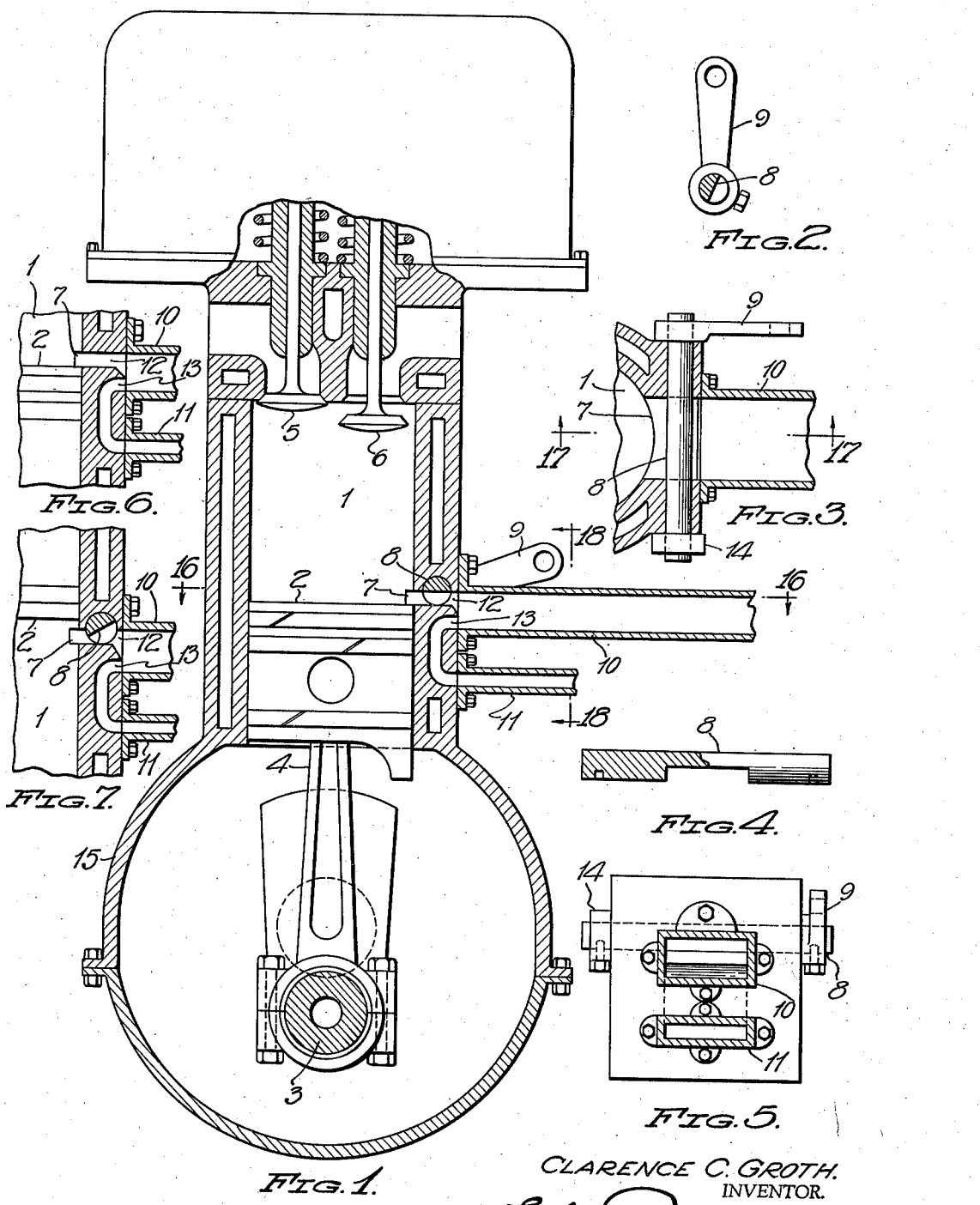
CLARENCE C. GROTH.
INVENTOR.
BY Ely & Pattison
ATTORNEYS.

Patented July 12, 1938

2,123,302

UNITED STATES PATENT OFFICE 2,123,302

INTERNAL COMBUSTION ENGINE

Clarence C. Groth, New York, N. Y.

Application March 23, 1937, Serial No. 132,465

11 Claims. (Cl. 123—75)

My invention relates to improvements in engines of the four stroke cycle type, and provides for the releasing of exhaust gases through a port in the cylinder wall and admitting air into the cylinder through the same port. In this application, it is my desire to cover broadly, means in which the inertia of the gases make this possible.

My invention is adaptable to any four stroke cycle internal combustion engine, of any size, number, or arrangement of cylinders. My invention is adaptable to air cooled and liquid cooled engines. In the carburetor or common gasoline type engine, my invention increases the efficiency of the engine by reducing the back pressure on the piston during the exhaust stroke, and increases the volumetric efficiency of the cylinder on the suction stroke by admitting air into the cylinder through a port uncovered by the piston when the piston is at or near the end of the suction stroke. By admitting air in this manner, it is not readily mixed with the explosive charge above, and in this way does not dilute the charge surrounding the spark plug. In Diesel and semi-Diesel engines, the reduction of the back pressure on the pistons and the greater breathing capacity of the engines provided by this invention is of great value.

An object of my invention is to increase the efficiency of an engine by releasing exhaust gases, at or near the end of the power stroke, through a port in the cylinder, which is uncovered by the piston, when the piston is at or near the end of the power stroke. This reduces the pressure within the cylinder, resulting in less back pressure on the piston during the exhaust stroke.

Another object of my invention is to increase the efficiency of an engine by admitting air into the cylinder, at or near the end of the suction stroke, through a port in the cylinder which is uncovered by the piston when the piston is at or near the end of the suction stroke. This increases the volumetric efficiency of the cylinder by filling the cylinder to as near atmospheric pressure as possible.

Another object of my invention is the use of a valve to vary the amounts of air permitted into the cylinder through the port in the cylinder wall. By opening and closing this valve, the operator of the engine can permit the passage of the proper amounts of air into the cylinder that will give the best results at varying speeds and power requirements.

Another object of my invention is to permit the keeping of the engine exhaust valve closed longer, and in this way obtaining more power from the explosion within the cylinder. This feature can readily be appreciated, when it is known that in high speed engines, the engine exhaust valve must be opened considerably before the end of the power stroke, in order to reduce the pressure in the cylinder to as near atmospheric pressure as possible, thus preventing excessive back pressure on the piston during the exhaust stroke. In many engines, the exhaust valve opens 45° or more, before the end of the power stroke.

Another object of my invention is to produce a cooler running engine by reducing the amount of exhaust gases passing through the engine exhaust valve.

Another object of my invention is to achieve this greater breathing capacity of an engine by simple construction, with no engine driven parts to wear or get out of order.

My invention accomplishes the above objects and others, by providing means for releasing exhaust gases from the cylinder through a port in the cylinder wall which is uncovered by the piston when the piston is at or near the end of the power stroke, and utilizing the inertia of these gases to draw air adjacent to the port so that when the piston again uncovers the port at or near the end of the suction stroke, air will be drawn into the cylinder.

The constructions shown in the drawing are merely simple means of carrying out the broad idea of this invention, and I do not therefore wish to limit this invention to the use of a valve in the passage to the port, nor do I wish to limit this invention to any type of valve, nor do I wish to limit this invention to any size, shape, or number of ports.

I attain the above objects by construction illustrated in the accompanying drawing in which:—

Fig. 1 is a vertical section of one cylinder of an engine on the line 17—17 of Fig. 3. In this view, a valve is used to control the passage to the port. The valve is shown completely open and the piston is shown long enough to cover the port when the piston is at the top of the stroke; Fig. 2 is a view of the valve and its controlling lever with the valve shown in cross section on line 17—17 of Fig. 3; Fig. 3 is a sectional view looking from the top on line 16—16 of Fig. 1 showing the valve, lever, and collar in place, but these three are not shown in cross section; Fig. 4 is a view of the valve shown partly in cross section; Fig. 5 is a view of the plane formed on the outside of the cylinder to which the exhaust pipe and air inlet pipe are bolted. The exhaust pipe and air inlet pipe are shown in cross section on line 18—18 of Fig. 1; Fig. 6 is a view of this invention on line 17—17 of Fig. 3 and is the same as Fig. 1 with the exception that the valve is eliminated; Fig. 7 is a view of this invention on line 17—17 of Fig. 3 and is identical with Fig. 1 with the exception that the port is uncovered by the piston when the piston is at the top of its stroke and the valve is shown partly closed.

Throughout the several views, similar numerals refer to similar parts.

Numeral 1 represents the cylinder; 2 is the piston; 3 is the crankshaft; 4 is the connecting rod; 5 is the engine inlet valve; 6 is the engine exhaust valve; 7 is the port in the cylinder located so that it is uncovered by the piston when the piston is at or near the bottom of its stroke and is covered by the piston, when the piston moves upward on its upward stroke, thus the port is opened and closed by the piston in the cylinder; 8 is the valve operated by the operator of the engine to open and close the passage from the port through the cylinder wall; 9 is the lever operated by the operator of the engine which opens and closes the valve; 10 is the exhaust pipe; 11 is the air inlet pipe; 12 is the passage through the cylinder wall; 13 is the air inlet passage leading from the air inlet pipe through the cylinder wall to the exhaust pipe; 14 is a collar attached to one end of the valve to hold it into place; 15 is the engine crankcase.

As the piston descends on the power stroke, it uncovers port 7, permitting the passage of exhaust gases through the passage 12 into the exhaust pipe 10. As the piston ascends on the exhaust stroke, it closes port 7, leaving the exhaust gases passing through exhaust pipe 10 at a high rate of speed. The inertia of the rapid moving exhaust gases tends to create a vacuum in passage 12 and the end of exhaust pipe 10 that is bolted to the cylinder. The vacuum or partial vacuum thus created, draws air into passage 12 and exhaust pipe 10 through the air inlet passage 13. Upon the piston's return on the suction stroke, it uncovers port 7 again, and air will be drawn into the cylinder instead of exhaust gases. As the piston ascends on the compression stroke, it again closes port 7. There is a somewhat continuous circulation of air from air inlet passage 13 into exhaust pipe 10 actuated by the inertia of the exhaust gases in exhaust pipe 10, by the inertia of the moving air in air inlet passage 13 and air inlet pipe 11, and by the partial vacuum within the cylinder at the end of the suction stroke.

As long as the engine operates, this cycle of events continues to repeat.

Due to the fact that the pressure within the cylinder is always less than atmospheric pressure when the piston is at the end of the suction stroke, air will be drawn into the cylinder.

Valve 8 is to be opened and closed by the operator of the engine to vary the amounts of air permitted to enter the cylinder through port 7. By opening and closing this valve, the operator of the engine can permit the passage of the proper amounts of air into the cylinder that gives the best results at varying speeds and power requirements, and for starting. In the Diesel type engines, valve 8 can be eliminated entirely.

I claim:

1. In a four stroke cycle internal combustion engine, in combination, an engine cylinder having an auxiliary port, a piston movable within the cylinder and adapted to cover and uncover said auxiliary port, and an exhaust line leading from the auxiliary port and having constant communication through its intake end with the auxiliary port and with atmosphere.

2. In a four stroke cycle internal combustion engine, in combination, an engine cylinder having an auxiliary port, a piston movable within the cylinder and adapted to cover and uncover said auxiliary port, an exhaust line leading from the auxiliary port and having constant communication through its intake end with the auxiliary port and with atmosphere, and means in the exhaust line between the auxiliary port and the air inlet to said exhaust line for restricting the passage of exhaust gases and air through the port.

3. In a four stroke cycle internal combustion engine, in combination, an engine cylinder having an auxiliary port, a piston movable within the cylinder and adapted to cover and uncover said auxiliary port, an exhaust line leading from the auxiliary port with its intake end in communication with the auxiliary port of the cylinder, and means having constant communication with said exhaust line for supplying air to said auxiliary port for passage therethrough into the engine cylinder.

4. In a four stroke cycle internal combustion engine, in combination, an engine cylinder having an auxiliary port, a piston movable within the cylinder and adapted to cover and uncover said auxiliary port, and an exhaust line leading from the auxiliary port, said exhaust line having an unrestricted passage leading therethrough and having constant communication through its intake end with the auxiliary port of the engine, and means for supplying air to said exhaust line.

5. In a four stroke cycle internal combustion engine, in combination, an engine cylinder having an auxiliary port, a piston movable within the cylinder and adapted to cover and uncover said auxiliary port, an exhaust line leading from said auxiliary port and adapted to receive therefrom exhaust gases from the engine cylinder, and means having constant communication with said exhaust line for introducing air into said exhaust line in a stream moving through the exhaust line in the same direction of movement as that of the exhaust gases.

6. In a four stroke cycle internal combustion engine, in combination, an engine cylinder having an auxiliary port, a piston movable within the cylinder and adapted to open and close said auxiliary port, an exhaust line leading from said auxiliary port and having communication therewith, and means having constant communication with said exhaust line for introducing air into the exhaust line by the action of exhaust gases passing therethrough.

7. In a four stroke cycle internal combustion engine, in combination, an engine cylinder having an auxiliary port, a piston movable within the cylinder and adapted to open and close said auxiliary port, an exhaust line leading from said auxiliary port and adapted to receive and convey exhaust gases therefrom, said exhaust line having constant communication through its intake end with said auxiliary port and means having communication with the exhaust line and responsive to the inertia of exhaust gases passing through the exhaust line for displacing said exhaust gases with air.

8. In a four stroke cycle internal combustion engine, in combination, an engine cylinder having an auxiliary port, a piston movable within the cylinder and adapted to open and close said auxiliary port, an exhaust line leading from said auxiliary port and adapted to receive and convey exhaust gases therefrom, and means having constant communication with atmosphere and with the intake end of the exhaust passage and responsive to the inertia of exhaust gases moving through said exhaust passage for displacing said exhaust gases with air at atmospheric pressure subsequent to the covering of the said auxiliary port by the piston.

9. A four stroke cycle internal combustion engine having in combination, an engine cylinder having an auxiliary port, a piston movable within the cylinder and adapted to open and close said auxiliary port, an exhaust line leading from said auxiliary port and adapted to receive and convey exhaust gases therefrom, and means having communication with atmosphere and having constant communication with the exhaust line and responsive to the inertia of exhaust gases passing through the exhaust line for displacing exhaust gases with air in the intake end of the exhaust line.

10. A four stroke cycle internal combustion engine having in combination, an engine cylinder having an auxiliary port, a piston movable within the cylinder and adapted to open and close said auxiliary port, an exhaust line leading from said auxiliary port and adapted to receive and convey exhaust gases therefrom, means having communication with atmosphere and having constant communication with the exhaust line and responsive to the inertia of exhaust gases passing through the exhaust line for displacing exhaust gases with air in the intake end of the exhaust line, and means in the exhaust line between the auxiliary port and the air inlet to said exhaust line for restricting the passage of exhaust gases and air through the auxiliary port.

11. A four stroke cycle internal combustion engine having in combination, an engine cylinder having an auxiliary port, a piston movable within the cylinder and adapted to cover and uncover said auxiliary port, an exhaust line leading from the auxiliary port, said exhaust line having constant communication through its intake end with said auxiliary port, means for supplying air to said exhaust line, and means in the exhaust line between the auxiliary port and the air inlet to said exhaust line for restricting the passage of exhaust gases and air through the auxiliary port.

CLARENCE C. GROTH.